Sept. 20, 1971 R. C. DEAN, JR., ET AL 3,605,843
CASHEW NUT SHELLER
Filed Jan. 2, 1970 3 Sheets-Sheet 1

INVENTORS
ROBERT C. DEAN, JR.
RICHARD W. COUCH, JR.
BY
Kenway, Jenney & Hildreth
ATTORNEYS Sept. 20, 1971   R. C. DEAN, JR., ET AL   3,605,843
CASHEW NUT SHELLER Filed Jan. 2, 1970   3 Sheets-Sheet 3

INVENTORS
ROBERT C. DEAN, JR.
RICHARD W. COUCH, JR.

BY

ATTORNEYS

3,605,843
CASHEW NUT SHELLER
Robert C. Dean, Jr., Norwich, and Richard W. Couch, Jr., South Royalton, Vt., assignors to Creare, Inc., Hanover, N.H.
Filed Jan. 2, 1970, Ser. No. 138
Int. Cl. A23h 5/00
U.S. Cl. 146—223      18 Claims

ABSTRACT OF THE DISCLOSURE

A method and apparatus for removing explosively the kernel of a cashew or similar nut from its shell while isolating the kernel from contamination. The explosive opening of the nut-shell results from a technique in which the nut initially is subjected to a compressed gas for a time interval during which the internal pressure of the nut is raised. The nut then is exploded rapidly, to a lower pressure which fractures the shell and separates the shell from the kernel. The nuts are isolated and exploded individually and in rapid, continuous succession. As each nut is exploded both its kernel and shell are ejected from the machine along different trajectories and are collected and sorted separately and automatically thus avoiding any contact between the separated shells and kernels.

BACKGROUND OF THE INVENTION

In order to appreciate the objectives attained by our invention it is necessary to understand the structure of the cashew nut. The cashew tree, *Anacardium occidentale* belongs to the Anacadiacese family, of which, poison oak and poison ivy also are members. The kidney-shaped cashew nut is carried at the end of the cashew fruit which, of itself, has little commercial value. The cashew nut includes a leathery outer layer and a thin, hard inner layer which contains the kernel. An intermediate honeycomb layer exists between the outer and inner layers. The honey comb interior contains a resinous liquid of high commercial value, which is used in such industries as plastics, paints, brake lining, and others. The resinous caashew nut shell liquid (referred to as CNSL) produces a skin reaction similar to that of poison ivy. In its natural state the kernel of the cashew nut is isolated from the CNSL by the hard inner shell and by a thin brown skin or testa which surrounds the kernel. It is imperative that the CNSL does not contact and contaminate the kernel at any time during the shelling process or thereafter.

Shelling of the cashew nut has been one of the most troublesome bottlenecks to profitable commercial exploitation of the cashew industry. Accordingly, the need for a commercially practical shelling machine is clear. It is the general and primary object of our invention to provide such a machine.

In order to achieve commercially practical shelling a number of considerations must be taken into account. Initially, the structure of the cashew nut is resistant to extraction of its kernel. Because of the soft honeycomb layer, the nutshell resists conventional brittle cracking techniques. Additionally, the CNSL must be isolated from and must not contaminate the kernel. Such contamination is among the more troublesome difficulties in shelling cashew nuts. As long as the thin testa remains unruptured the kernel is protected. Isolation between the CNSL and the kernel is also important in order to preserve the commercially valuable CNSL. An additional major consideration is sorting of the shells and kernels after they have been cracked. Sorting should be automatic and should be capable of operating at the same speed as the shelling unit itself.

A number of techniques for shelling cashew nuts have been proposed in the prior art. The most crude of these techniques is that of hand cracking in which the worker shells the nuts manually and individually with a hammer and anvil. This slow, laborious technique is harmful to the worker in that he is contacted, unavoidably by CNSL which has a caustic action on his skin. Manual cracking generally results in a high spoilage rate of the kernels. Additionally, after the kernel is removed it is necessary to remove the thin protective testa. It is important to note that even though the hand cracking technique is the most crude and primitive of shelling methods, it still is in use on a wide scale. This is clear evidence that a commerically practical automatic shelling technique has not yet been developed.

One of the previously proposed automatic techniques is to weaken the shell by cutting or sawing and then splitting it apart with the knife or the saw. It is believed that this technique has not achieved more than limited commercial success because of the difficulty in avoiding cutting through the testa and contaminating the kernel.

Another technique is that of "explosive shelling" in which the nuts are "soaked" in a high pressure gas for a predetermined time interval during which the pressure within the nut builds up to equalize that about the nut. The external pressure then is released suddenly and violently to establish a large pressure differential across the shell to cause its rupture.

Our invention embodies this general method of shelling in a workable practical machine.

It has been recognized that certain conditions of pressure and time must be satisfied to achieve proper explosion of the cashew nutshell. For example, a pressure drop of the order of 200 p.s.i. within 5 milliseconds results in a clean separation of kernel and shell. Although machines have been proposed to satisfy these operating conditions none actually has achieved them in a commercially practical embodiment. In general, these machines have treated the cashew nuts in batches both during compression and the rapid decompression stages. The valving mechanisms to accomplish the required rapid decompression have been in capable of producing the necessary pressure drop within the limited time period. Because decompression has been attempted in batches the valving arrangements have been relatively massive and of high inertia in order to exhaust rapidly the relatively large volumes in which the batches are stored. These valves simply cannot act fast enough. Additionally, when exploding the nuts in batches, the shell and kernels must be separated and sorted subsequently. Because the shells and kernels are not separated simultaneously with explosion, the possibility of contamination of the kernels with CNSL is present.

Our invention provides a practical, continuous, explosive sheller which shells cashew nuts individually and in succession instead of in batches. The invention operates at high speed and achieves the conditions of pressure and time necessary for proper explosion. Additionally, each kernel is separated immediately and permanently from its shell thus eliminating the problem of subsequent sorting and contamination with CNSL.

SUMMARY OF THE INVENTION

In practicing our invention the nuts are loaded in an enlarged storage and pressure tank where they are subjected to air or gas under pressure, preferably of the order of 250 p.s.i. Nuts pass through and are withdrawn from the storage tank at a rate which permits the internal pressure of the nuts to be raised to that within the tank. The nuts flow through the system at a continuous, steady rate.

Instead of attempting to explosively decompress a large batch of nuts, our technique is to transfer the nuts individually from the pressure chamber to a relatively small ejection or explosion chamber which may be opened to the atmosphere through a valved exhaust port. The ejection chamber is maintained at substantially the same high saturation pressure is that of the storage tank until the valve is opened quickly to the atmosphere. The rapid explosive decompression causes the nut shell to rupture and eject the kernel. Additionally, the rapid pressure drop causes both shell and separated kernel to be ejected from the machine through the exhaust port. Because of the difference in shape and mass between the kernel and shell, their aerodynamic characteristics differ so that the ejected nutshell and kernel will assume different trajectories. Receptacles are located appropriately about the machine to catch and receive the separated kernels and shells. Separation and sorting of the kernels and shells therefore is immediate upon explosion.

The machine for accomplishing our technique includes a rotor having a radial passage forward therethrough which is open at the periphery of the rotor. The rotor is driven within a surrounding and close-fitting stator which has an exit port. The radial passage on the rotor and the exit port in the stator cooperate to form a valve which is open to the atmosphere when the radial passage of the rotor is in registry with the exit port in the stator. The pressurized nut is introduced into the radial passage through an inlet formed along the central axis of rotation of the rotor. The central inlet and radial passage are in communication with the pressurized storage tank which maintains the high pressure within the passage when the radial passage and exit port are not in registry. On in the passage, the nut is centrifuged radially and outwardly toward the stator. When the rotor passage registers with the exit port in the stator the passage is exhausted immediately to the atmosphere to exposively decompress the nut and eject it from the machine through the exit port. The rotor is driven continuously and at a constant speed sufficient to maintain the exit port open for a time interval to enable the nut to be exploded and ejected. It is important to note that because the rotor is driven at a constant speed the valve may be opened and closed without overcoming any massive inertia. The valve speed is controlled so that the exit port is closed immediately after the separated kernel and nut have been ejected.

The invention also includes modifications of above mechanism which result in more efficient operation. For example, although the foregoing single rotor arrangement opens and closes the exhaust port quickly, some of the pressurized gas from the system will escape through to the atmosphere from the open valve. This may be avoided by modifying the rotor to isolate that portion of the radial passage which contains the nut from the pressurized tank before the exhaust port is opened. In an illustrative embodiment of the invention this is achieved by employing a double rotor having inner and outer concentric rotor elements which rotate in unison. Each of these rotors includes a radially formed passage. The passages are in substantial registry with each other. The nut is transferred radially outwardly from the pressure tank to and through the inner rotor passage and then to the passage in the outer rotor. The free passage between the inner and outer rotors then is obstructed to isolate the outer passage from the system. The passage of the rotor containing the nut then is vented rapidly to the atmosphere while communication between the inner and outer passages is blocked. This valving action is provided by a pair of concentric stators which cooperate with the rotors. An inner stator is disposed between the inner and outer rotors and includes a transfer port which permits the nut to be transferred from the passage in the inner rotor to the passage in the outer rotor when these passages are rotated into registry with the transfer with the transfer port of the inner stator. Continued rotation of the rotors thereafter closes the transfer port to isolate the nut in the outer passage or explosion chamber. As the rotation of the rotor continues, the nut in the explosion chamber is advanced into registry with the exhaust port in the outer stator to explode the nut. During explosion when the exhaust port is open to the atmosphere, flow between the passages in the inner and outer rotors is blocked by the inner stator.

It is among the objects of our invention to provide an apparatus for achieving the condition of explosive decompression necessary to explode properly nuts of the character described and to effect such explosion without contamination of the kernels.

A further object of our invention is to achieve separation and collection of the disassociated shells and kernels in a simple manner simultaneously with the explosion to eliminate the possibility of subsequent kernel contamination.

A further object of our invention is to provide a technique in which nuts are exploded individually, in rapid succession and in a continuous process.

Also among the objects of our invention is to provide a valving arrangement which achieves rapid decompression without utilizing massive valve elements having high inertia.

Another object of our invention is to provide a shelling machine of simple operation having few moving parts and which need not be repaired frequently. This is very important when the machine is intended to be used in a tropical environment where conditions of climate may be extreme and where refined repair facilities may not be available readily.

Other objects and advantages of the invention will be apparent from the following detailed description thereof, with reference to the accompanying drawings wherein.

Figure 8:
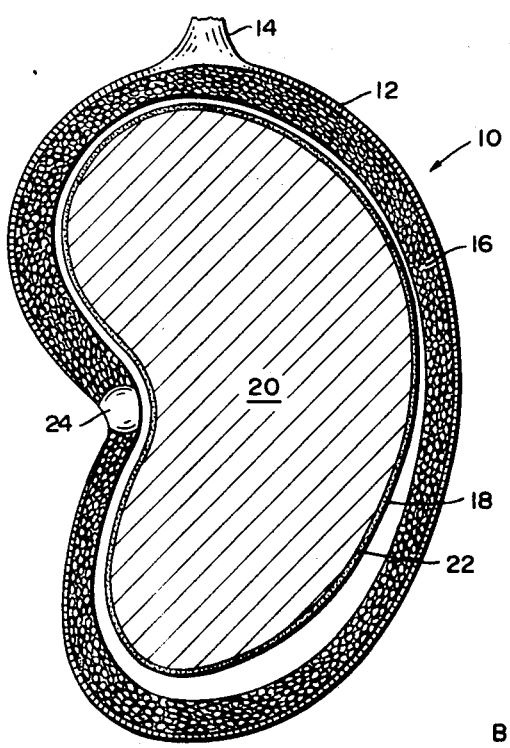
FIG. 8 is a sectional view of a cashew nut.

As shown in FIG. 8 the nut, indicated generally by the reference character 10, includes a soft, leathery outer shell 12 which is attached to the cashew apple by the pistil 14. The second, soft honeycomb layer 16 defined multitudinous pockets which contain the resinous CNSL. The next inner layer 18 comprises a hard, brittle inner shell which contains the kernel 20. The kernel 20 is surrounded by a very thin brown membrane or testa 22. A slight clearance exists between the testa 22 and inner surface of the hard brittle inner shell 18. The testa isolates the kernel from the CNSL. The nut grows from a germination point or eye 24 which is fibrous in character and contains no CNSL. A natural line of cleavage (not shown) extends from the pistil 14 to the germination point 24. This line also contains little CNSL. It is this area which the workers attempt to strike when cracking the nut manually. It is of further interest to note that the average nut weighs approximately 10 grams and that 30 percent of this weight is accounted for by the kernel 20.

Figure 1:
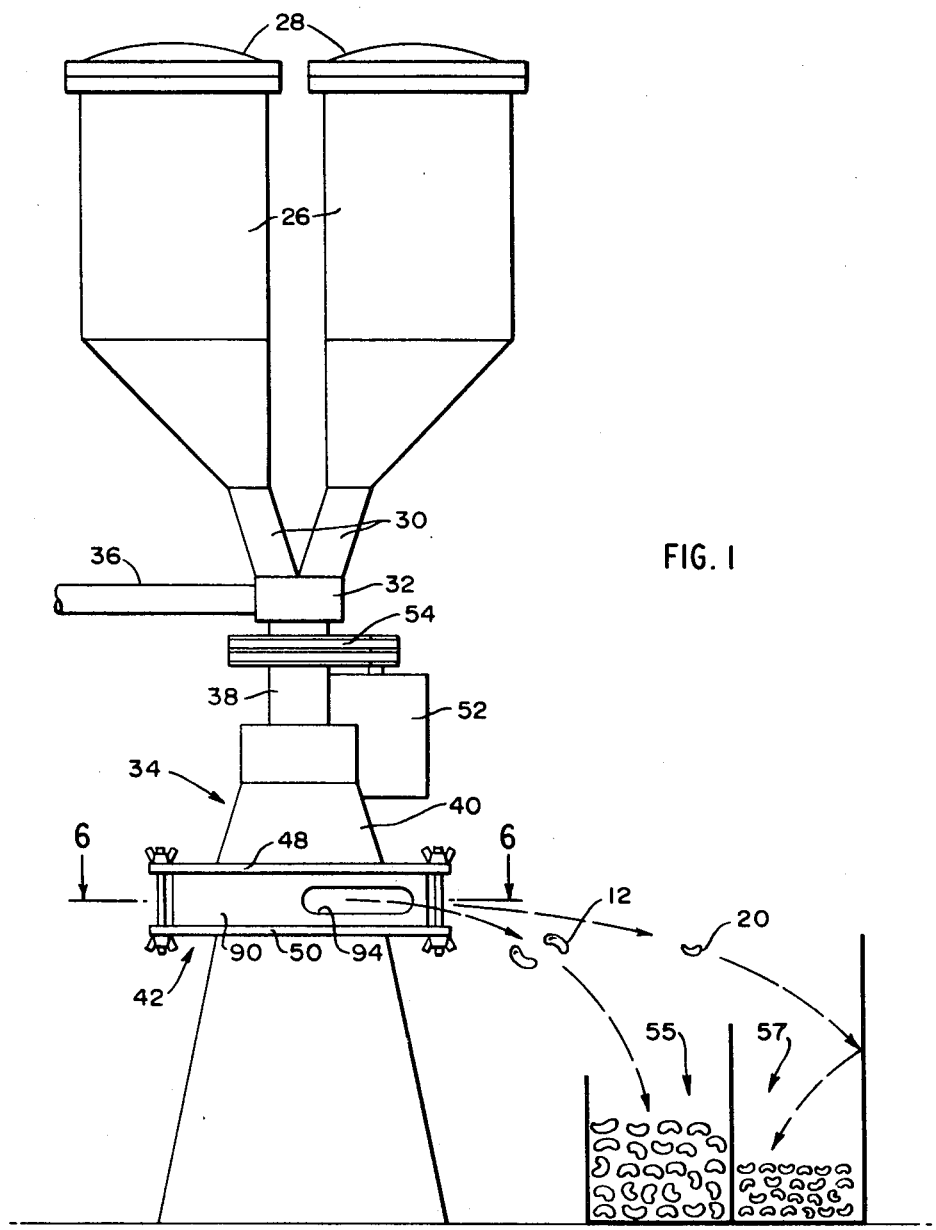
FIG. 1 is a somewhat schematic elevation of a shelling machine incorporating the invention.

FIG. 1 illustrates, somewhat schematically, a machine incorporating our invention. The machine includes one or more loading tanks 26 which receive the nuts in bulk. Covers 28 are provided for each of the loading tanks and preferably are sealed after loading to preclude any compressed gas from escaping from the machine through loading tanks 26. The nuts gravitate through the loading tank through a chute 30 to a valving arrangement 32 which controls the admission of nuts into the shelling device, indicated generally by the reference character 34. The valving arrangement 32 is connected to a source of compressed air or other gas, such as a conventional compressor, through the conduit 36 and admits compressed air into the loading tank 26 and through the shelling unit 34 as described below. The nuts gravitate from the valve 32 through the neck portion 38 of the shelling unit, into and through a pressure chamber 40 and then into a rotary sheller 42 in which the nuts are shelled explosively.

The compressed air introduced through the conduit 36 preferably is at a pressure of approximately 250 p.s.i. By introducing the air to the system at this pressure it is possible to obtain a pressure drop approximating 200 p.s.i. when the nuts are exposed rapidly to the atmosphere. Furthermore, introducing the air to the system at this pressure includes an allowance for pressure loses throughout the system. The nuts are subjected to the compressed air throughout the system while in the loading tank and while passing to and through the shelling unit 34. The flow rate of the nuts through the system should be controlled so that they are subjected to the compressed air for a time interval sufficient to enable the gas to diffuse through the shell until the internal pressure of the nuts builds up and equals that within the system. When the nuts have gravitated to the rotary sheller 32 their internal pressure is equal to that within the system (approximately 200 p.s.i. above atmospheric pressure) and are in readiness to be exposed rapidly to the atmosphere.

Figure 2:
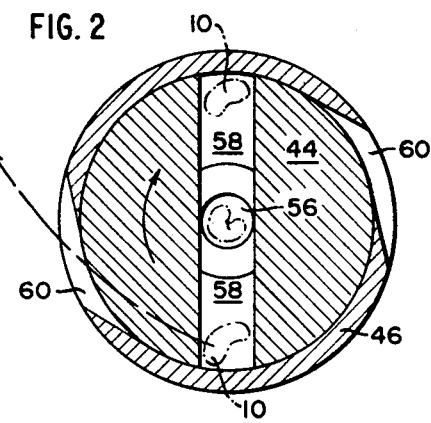
FIG. 2 is a plan view, in section, taken through the rotary shelling unit and illustrating a simplified version of the rotor-stator shelling unit.

The rotary sheller 42 is designed to receive the saturated nuts and then expose each of the nuts individually to the atmosphere within a short time interval of the order of five milliseconds to explode the nut shell. FIG. 2 shows a simplified version of the rotary sheller 42. This embodiment includes a rotor 44 rotatably mounted within a stator 46 which defines the outer wall of the sheller 42. The rotor 44 is sealed within the stator 46 by top and bottom plates 48, 50 which are secured and sealed together to enclose the rotor. The rotor 44 which preferably is formed integrally with the neck 38, is driven by a motor 52 and belt drive 54 connected to the neck. The neck 38 is hollow and leads to a central passage 56 in the rotor 44. The nuts thus pass through the hollow of the rotating neck portion 38 downwardly to the inlet opening 56 and into a radial or diametral passage formed in the rotor 44. The increased pressure is maintained throughout the foregoing path of movement of the nut. As described herein the hollow portion of the neck 38 and passageway 56 will be referred to as the "pressure chamber" and the radial passage 58 in the rotor 44 will be referred to as "the explosion chamber."

The passage 58 terminates at the periphery of the rotor for cooperation with the stator. The stator 46 includes exhaust ports 60, there being one such exhaust port for each peripheral opening of the passage 58. Thus, as the rotor 44 spins the radial passage 58 will be vented at regular, brief intervals to the atmosphere as the passage 58 rotate into registry with their associated ejection or exhaust ports 60. The explosion chamber 58 is dimensioned to permit the nuts to pass individually and in a radially outward direction toward the stator 46. During operation the nuts in the spinning explosion chamber are centrifuged outwardly against the stator 46. When the chambers 58 are rotated into registry with their exhaust ports 60 on the stator 46, the chambers 58 are vented rapidly to the atmosphere thus exposing the outermost of the nuts in the passage 58 to an immediate pressure drop of the order of 200 p.s.i. The rapid pressure drop causes the nutshell to explode thus separating the kernel and shell and also causes the exploded nut to be ejected from the machine through the ejection port 60. It is important to note that the rotor-stator arrangement permtis the rapid pressure drop to be achieved within the predetermined time interval necessary to explode the nut properly. Furthermore, this rapid pressure drop is achieved without the use of massive valves having high inertia and corresponding sophisticated drive mechanism for opening and closing such massive valves.

Although it is preferred that the explosion chamber 58 is designed to receive and explode one nut at a time it is possible that more than one nut may be captured within the explosion chamber before it is exhausted to the atmosphere. In this event, each of the nuts will be ejected and exploded through the exhaust port 60. It should be noted further that the foregoing description of the explosion mechanism 42 has been simplified for clarity in explanation. In order to achieve a high output a number of such rotors and stators may be stacked along a common central axis to provide a large number of cooperative explosion chambers and exhaust ports.

The nearly instantaneous explosion of the nut separates the shell from the kernel and simultaneously ejects both shell and kernel along an initially straight, tangential path. Because of the differences in mass and aerodynamic drag of the kernel and its associated shell they will assume diffent trajectories in which the shell will fall short of the kernel. This aspect of the invention is important in that it ensures separation of the kernel and its CNSL-bearing shell to preclude contamination. Additionally, it enables the kernels and shells to be caught separately in appropriately placed receptacles thus eliminating the necessity of separating the shells from the kernels as had been done in the prior art. As shown in FIG. 1 the kernels and shells may be collected by receptacles 55, 57 appropriately placed about the machine in the paths of the trajectories of the shells and kernels. The receptacles may extend circumferentially about the machine with the kernel receptacle 57 located in the outer position.

Figure 3:
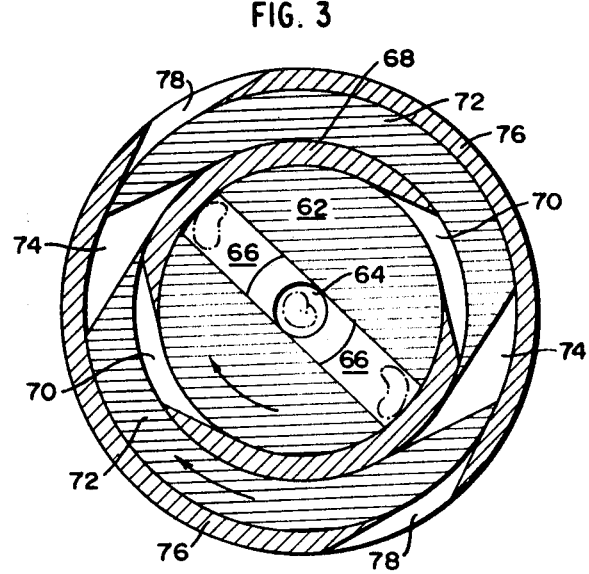
FIG. 3 is a plan view, in section, taken through the rotary shelling unit and illustrating an improved, valved version of the shelling unit.
Figure 4:
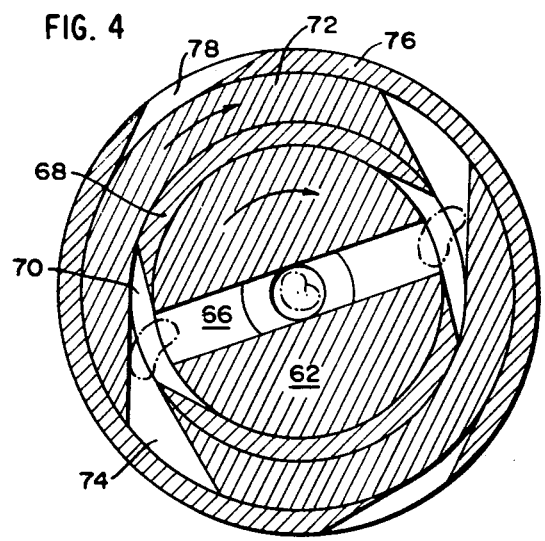
FIG. 4 is a view of the shelling unit similar to that of FIG. 3 and illustrating the position of the rotor and stators as a nut is transferred from the inner rotor to the explosion chamber in the outer rotor.
Figure 5:
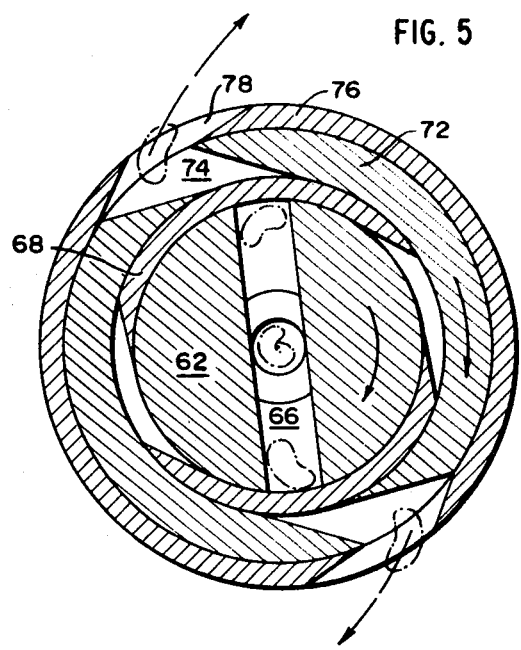
FIG. 5 is a view similar to that of FIGS. 3 and 4 illustrating the position of the rotors and stators when the explosion chamber in the outer rotor is vented to the atmosphere to explode and eject the nut.

FIGS 3, 4 and 5 show an improved embodiment of the rotor-stator explosion sheller shown in FIG. 2. When the explosion chamber 58 of the above simplified sheller is in registry with the exhaust port 60 the pressurized interior of the machine is open, briefly, to the atmosphere. This may cause an undesirable pressure drop or may cause pressure fluctuations within the system. Furthermore, if for some reason the explosion chamber misfires and does not contain a nut it would provide a brief but clear vent to the atmosphere which would aggravate the pressure loss. The possibility of such pressure loss or fluctuation may be eliminated by providing a valved, multiple rotor and stator arrangement as shown in FIG. 3. This embodiment includes an inner rotor 62 which is similar to the rotor 44 of FIG. 2 and includes a central inlet opening 64 and radial passages 66. The inner rotor 62 is surrounded and cooperates with an inner stator 68 having transfer ports 70 which are registrable with the radial passages 66 as the inner rotor 62 is rotated. An outer rotor 72 is formed integrally with the inner rotor 62, so that both rotors rotate in unison. The outer rotor 72 includes generally radial passages 74 which extends through the outer rotor 72. The passages 74 in the outer rotor and passages 66 in the inner rotor are arranged in general alignment and registry but are separated and isolated by the inner stator 68 as shown in FIG. 3. Rotation of the rotor 62, 72, (clockwise as seen in FIG. 3) advances simultaneously the passages 66 and 74 toward the transfer port 70 formed in the inner stator 68 to effect communication between the inner passage 66 and outer passage 74 of the rotors 62, 72. The outward-most nut contained within the passage 66 will be centrifuged outwardly through the transfer port 70 and into the passage 74 during the brief time interval in which the passages and transfer ports are registered. In addition to transfer of the nuts from the inner rotor to the outer rotor, the brief communication between the inner and outer passages 66, 74 enables compressed air to fill the passage 74 and maintain the transfer nut in a pressured environment.

The outer rotor 72 is surrounded by a concentric outer stator 76. Exhaust ports 78 are formed in the outer stator 76 for cooperation with the rotating passages or explosion chamber in 74 the outer rotor. After a nut has been transferred from the inner rotor to the explosion chamber 74 in the outer rotor, continued rotation of the rotors brings the nut bearing explosion chamber 74 into registry with the exhaust port 78 to expose the chamber 74 and pressurized nut therein to the atmosphere. The exhaust ports 78 are disposed about the outer stator so that by the time the rotor has registered the explosion chamber 74 with the exhaust port 78, the passages 66 and 74 will have been rotated past the transfer port 70 on the inner stator to obstruct further communication between the inner passage 66 and the outer passage 74 when the nut is exposed to the atmosphere. The valving action eliminates substantially the possibility of pressure fluctuations in the system. Explosion and ejection of the nut takes place in isolation from the passage 66 and from the internal, pressurized system. Additionally, the various ports and passages are dimensioned so that only one nut will be transferred and exploded at a time.

Figure 6:
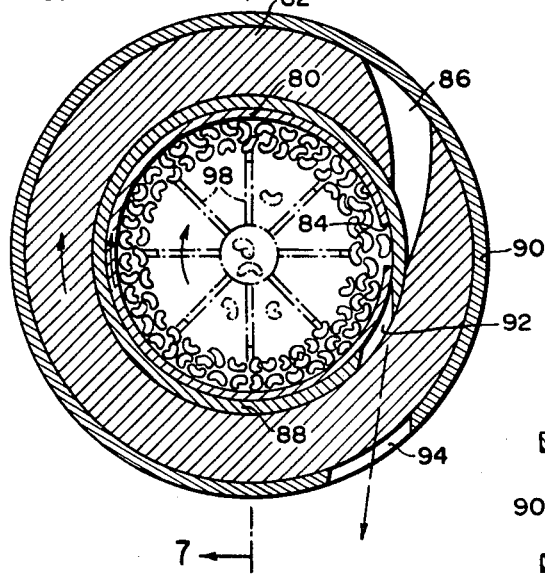
FIG. 6 is a plan view, in section, of yet another modified shelling unit as viewed along the plane 6—6 of FIG. 1.
Figure 7:
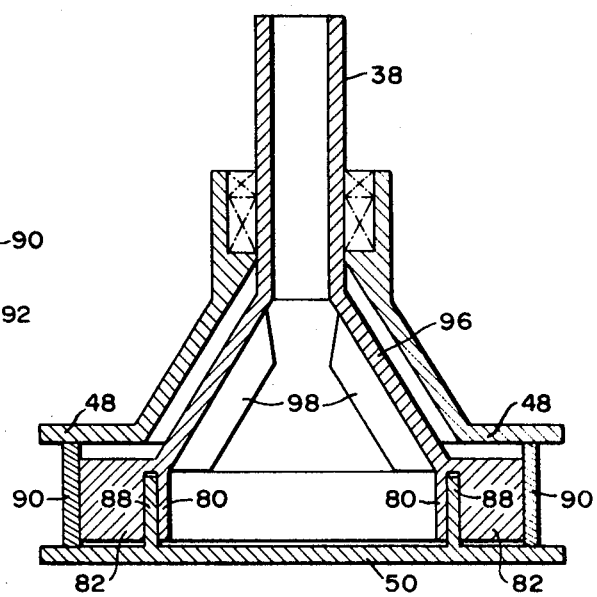
FIG. 7 is an elevation, in section, of the shelling unit shown in FIG. 6 as seen from the plane 7—7 of FIG. 6.

Another modified embodiment is shown in FIG. 6 and 7 and includes the unitary inner and outer rotors 80, 82 having passages 84, 86 formed respectively therein. The rotors 80, 82 cooperate with inner and outer stators 88, 90 in much the same manner as described above with regard to the embodiment shown in FIGS. 3, 4 and 5. The inner stator 88 includes a transfer passage 92 and the outer stator 90 has an exhaust port 94. As shown in FIG. 7 the inner and outer rotors 80, 82 are formed integrally and are connected to the neck 38 by means of a downwardly divergent cone 96. The inner and outer stators may be formed integrally with the bottom plate 50 and the rotor assembly, including the conical portion 96 and neck 38, are sealed and rotatably journaled within the housing 40. Paddles 98 preferably are secured to the inner surface of the cone 96 to aid in bringing the nuts up to the speed about the inner periphery of the inner rotor 80. As the nuts gravitate downwardly through the neck and into the chamber they are centrifuged outwardly toward and against the inner surface of the inner rotor to urge a nut into the inner passage 84 of the inner rotor. This arrangement operates in substantially the same manner as that shown in FIGS. 3, 4 and 5 in that when the passage 84 of the inner rotor rotates into registry with the transfer port 92, a nut will travel outwardly through the transfer port 92 and into the explosion chamber 86 in the outer rotor. The ports and passages are arranged so that the explosion chamber 86 is rotated past the transfer port 84, and therefore is isolated, before the explosion chamber 86 registers with the exhaust port 94 in the outer stator to vent and explode the nut.

In summary, we have provided an improved technique for shelling cashew nuts by explosive decompression of the nuts individually and in a rapid continuous sequence. The nuts may be pressurized in a batch. When shelled, the nuts are passed through a valving arrangement adapted to expose the nuts individually to the atmosphere and obtain the rapid explosive decompression necessary to effect shelling of the nut. Moreover, in the illustrative embodiment of the invention, there is included a simple rotary valving device capable of achieving the conditions of pressure and time necessary for explosive decompression. A single or multiple rotor and stator arrangement transfers the nuts individually through various passages and ports to the periphery of the rotor into a position in proximity to the interior of the outermost stator. The rotor advances to an exhaust port formed in the outer stator through which the captured nut is exploded and ejected. The rotary valving arrangement is extremely fast acting and enables the large pressure drop to be achieved within the necessary time interval. For example, we have found that a 200 p.s.i. pressure drop can be accomplished with a rotor peripheral speed of approximately 40 to 45 feet per second with the ports and passages being dimensioned as shown to receive the nuts individually. Because the valves are opened and closed in a continuous rotary motion it is not necessary to reverse the direction of movement as would be the case with conventional linear valves. The valving action does not require such cyclical movement of massive parts and provides a smooth uninterrupted motion.

The invention may be practiced with a machine having a few moving parts which require little maintenance or repair. This feature of the invention enhances its use in tropical or underdeveloped localities. Additionally, although it is preferred that the rotor and stator arrangement is as close fitting as reasonably possible it should be noted that these parts need not be fitted with extreme precision. Some pressure loss may be acceptable through the valving arrangement provided that the pressure drop when exposed to the atmosphere is sufficient to effect the explosive decompression.

It should be noted further that the rotors and stators in our apparatus have been shown with but a few of the possible porting and valving arrangements. Other porting and valving arrangements or contours may be employed to transfer the nuts individually to an explosion chamber in readiness for explosive decompression so long as the necessary conditions for explosive decompression are achieved.

Having thus described our invention what we desired to claim and secure by Letters Patent is:

1. A method for extracting the kernel of a nut from its shell comprising:
   subjecting said nut to gas under pressure for a predetermined time interval sufficient to enable the pressure within said nut to be raised to that of said gas;
   isolating said nut within a chamber at substantially the same pressure, said chamber being dimensioned to receive said nut individually; and
   exhausting rapidly said chamber to the atmosphere to decompress explosively said nut.

2. A method as defined in claim 1 wherein said chamber is exhausted through a port dimensioned to pass said nut therethrough whereby said exhaustion of said chamber simultaneously ejects said nut through said port.

3. A method as defined in claim 2 further comprising:
   catching said ejected kernel and shell in separate receptacles.

4. A method for extracting the kernel of a nut from its shell comprising:
   subjecting said nut to compressed gas in a first chamber for a predetermined time interval sufficient to enable said gas to diffuse through said shell to equalize the pressure within said shell;
   transfering said pressurized nut to a second chamber while maintaining said increased pressure within said second chamber;
   isolating said second chamber from first chamber while still maintaining said increased pressure within said second chamber to maintain the equilibrium of pressure internally and externally of said nut; and
   exhausting quickly said second chamber to the atmosphere through an exhaust port dimensioned to enable said nut to pass therethrough, said rapid exhaustion effecting simultaneous explosion of said nut and ejection of said nut through said exhaust port.

5. A method as defined in claim 4 further comprising:
catching said ejected kernel and shell in separate receptacles.

6. A method for extracting the kernel of a nut from its shell comprising:
subjecting said nut to gas under pressure in a pressure chamber for a time interval sufficient to enable the gas to diffuse through said shell to equalize the internal and external pressure of said nut;;
transferring said nut individually to a location in proximity to an ejection port formed in said chamber and maintaining said pressure about said nut; and
rapidly opening and closing said exhaust port to enable said transfer nut to be exposed to atmospheric pressure thereby simultaneously exploding said nut and ejecting said nut through said exhaust port.

7. A method as defined in claim 6 further comprising:
catching said ejected separated kernel and shell in separate receptacles.

8. A method as defined in claim 6 wherein said step of transferring said nut individually comprises:
advancing said nut into a radially extending passage formed in the rotor of a rotor valve;
maintaining said passage at said relatively high pressure;
rotating said rotor so that said passage registers with an exhaust port formed in said valve body to communicate the said passage with the atmosphere, said rotor being rotated at a speed sufficient to effect a rapid pressure drop about said nut whereby said nut may be exploded and ejected through said port; and
continuing said rotation of said rotor thereafter to close said port immediately.

9. An apparatus for extracting a kernel from a nut shell comprising:
a pressure chamber adapted to receive and store a batch of said nuts;
an explosion chamber in communication with said pressure chamber, said explosion chamber including valve means operable to exhaust said explosion chamber to the atmosphere;
means for introducing pressurized gas into said pressure chamber and for maintaining an increased pressure within said chamber to enable the internal pressure of said nut to be raised to a level equal to that of said pressurized gas;
means for transferring a pressurized nut from said pressure chamber to said explosion chamber; and
means for operating said valve means to exhaust said explosion chamber to the atmosphere rapidly thereby to explode said nut shell and eject said nut and kernel therefrom.

10. An apparatus as defined in claim 9 further comprising:
means for catching separately said kernel and said shell.

11. An apparatus as defined in claim 9 further comprising:
means for closing said valve means immediately and rapidly after said ejection and explosion of said nut.

12. An apparatus as defined in claim 9 wherein said valve means comprises:
a rotor having a generally radial passage formed therein, said passage comprising said explosion chamber;
a stator concentrically surrounding said rotor and having an exhaust port formed therein, said exhaust port being registrable with said explosion chamber in said rotor to enable said explosion chamber to be exhausted to the atmosphere; and
drive means for rotating continually said rotor within said housing to open and close said exhaust port.

13. An apparatus as defined in claim 12 further comprising:
means for obstructing said radial passage at a location radially inwardly of said nut after said nut is in said explosion chamber but before said explosion chamber is rotated into registry with said exhaust port on said stator.

14. An apparatus as defined in claim 13 wherein said rotor comprises:
an inner rotor element and outer, concentric rotor element mounted for rotation in unison therewith, said inner rotor element having an inner passageway formed therethrough, said inner passageway and said explosion chamber being in general registry with each other;
and wherein said stator comprises;
an inner concentric stator disposed between said inner and outer rotors normally to obstruct communication between said inner passageway and said explosion chamber of said inner and outer rotors, said inner stator having a transfer port formed therethrough to enable said passageway and explosion chamber of said rotors to be in communication when rotated into registry with said transfer port;
an outer, concentric stator circumscribing said outer rotor, said outer stator having an exhaust port disposed circumferentially beyond the transfer port of said inner stator to preclude communication between the explosion chamber in said outer rotor and said exhaust port in said outer stator until said explosion chamber has been rotated out of communication with said transfer port of said inner stator.

15. An apparatus as defined in claim 14 wherein said means for transferring said pressurized nut from said pressure chamber to said explosion chamber comprises:
a delivery passage formed centrally along the axis of rotation of said rotor means; and
means communicating said central delivery passage with said source of nuts under pressure.

16. An apparatus as defined in claim 15 wherein said delivery passage comprises:
a downwardly divergent cone formed integrally with said rotor means, said rotor means being formed at the bottom of said cone;
means communicating the upper apex of said cone with said source of pressurized nuts to deliver said nuts into said cone whereby as said rotor means and integral cone are rotated, said nuts will be centrifuged outwardly along the diverging conical surface toward said rotor means.

17. An apparatus as defined in claim 16 further comprising:
paddle means secured to the inner surface of said cone and being for engagement with nuts introduced into said cone to bring said nuts up to the rotational speed of said cone and said rotor means.

18. An apparatus as defined in claim 17 wherein said paddle elements terminate at their lower ends above the level of said rotor elements.

References Cited

UNITED STATES PATENTS

| | | | |
|---|---|---|---|
| 2,248,365 | 7/1941 | Leonard et al. | 146—223 |
| 2,248,367 | 7/1941 | Low | 146—223 |
| 2,771,927 | 11/1956 | Thaning | 146—223X |
| 2,806,501 | 9/1957 | Van Dijk | 146—8X |
| 3,009,561 | 11/1961 | Schoolcraft et al. | 146—8X |
| 3,276,495 | 10/1966 | Calfee | 146—8 |

WILLIAM S. LAWSON, Primary Examiner

U.S. Cl. X.R.

146—8